(12) United States Patent
Lin et al.

(10) Patent No.: US 8,750,807 B2
(45) Date of Patent: Jun. 10, 2014

(54) MEASUREMENT GAP CONFIGURATION IN WIRELESS COMMUNICATION SYSTEMS WITH CARRIER AGGREGATION

(75) Inventors: Shiang-Jiun Lin, Hsinchu (TW); Chia-Chun Hsu, Taipei (TW); Yih-Shen Chen, Hsinchu (TW); I-Kang Fu, Taipei (TW)

(73) Assignee: Mediatek Inc. (TW)

( * ) Notice: Subject to any disclaimer, the term of this patent is extended or adjusted under 35 U.S.C. 154(b) by 11 days.

(21) Appl. No.: 13/346,083

(22) Filed: Jan. 9, 2012

(65) Prior Publication Data

US 2012/0178465 A1     Jul. 12, 2012

Related U.S. Application Data

(60) Provisional application No. 61/431,301, filed on Jan. 10, 2011.

(51) Int. Cl.
     *H04B 17/00*        (2006.01)

(52) U.S. Cl.
     USPC ........ 455/67.11; 455/436; 455/437; 455/438; 455/439; 455/450; 455/451; 455/452.1; 455/515

(58) Field of Classification Search
     USPC .............. 455/67.11, 436, 437–439, 515, 450, 455/451, 452.1
     See application file for complete search history.

(56) References Cited

U.S. PATENT DOCUMENTS

| | | | |
|---|---|---|---|
| 2005/0233729 A1* | 10/2005 | Stojanovski et al. | 455/411 |
| 2007/0009054 A1 | 1/2007 | Kwak et al. | 424/94.1 |
| 2009/0046641 A1* | 2/2009 | Wang et al. | 370/329 |
| 2010/0267394 A1* | 10/2010 | Wu | 455/450 |
| 2011/0317577 A1* | 12/2011 | Yamada et al. | 370/252 |
| 2012/0113866 A1* | 5/2012 | Tenny et al. | 370/254 |

FOREIGN PATENT DOCUMENTS

| | | |
|---|---|---|
| CN | 101222773 A | 1/2009 |
| CN | 101873646 A | 4/2009 |
| CN | 101790219 A | 9/2009 |
| WO | WO2006137708 A1 | 6/2005 |
| WO | WO 2010073829 A1 * | 7/2010 |

OTHER PUBLICATIONS

R2-093877, LG Electronics Inc., Discussion on Measurement for CA, 3GPP TSG-RAN WG2 #66bis, Jun. 29-Jul. 3, 2009.

(Continued)

*Primary Examiner* — Rafael Pérez-Gutiérrez
*Assistant Examiner* — Thai Vu
(74) *Attorney, Agent, or Firm* — Zheng Jin (57) ABSTRACT

A method of measurement gap reporting and configuration is provided. In a mobile network, a UE receives a capability enquiry message from a serving base station. The UE comprises one or more radio frequency modules that support a list of frequency bands and a list of carrier aggregation (CA) band combinations. In response to the enquiry, the UE transmits capability information containing measurement parameters to the base station. In one embodiment, the measurement parameters comprise need-for-gap parameters for each frequency band and each CA band combinations associated with a list of to-be-measured frequency bands of target cells. Based on the reported measurement parameters, the eNB transmits a measurement configuration message to the UE. Finally, the UE transmits a measurement gap application message back to the base station. The measurement gap application message indicates whether the UE applies MG for each configured component carrier.

19 Claims, 8 Drawing Sheets

(56) References Cited

OTHER PUBLICATIONS

R2-106284, Qualcomm Incorporated, Indication of need for measurement gaps in carrier aggregation, 3GPP TSG-RAN WG2 #71, Nov. 15-16, 2010.

R4-102395, Research in Motion UK Limited, Measurement Gap for carrier aggregation, 3GPP TSG-RAN WG4 (Radio) Meeting Ad Hoc 3, Bratislava, SK, Jun. 28-Jul. 2, 2010.
International Search Report and Written Opinion of International Search Authority for PCT/CN2012/070182 dated May 3, 2012 (11 pages).

* cited by examiner

| MEASUREMENT PARAMETERS (NEED FOR GAPS) | | BAND LIST EUTRA | | | | | CA BAND COMBINATION LIST EUTRA | | |
|---|---|---|---|---|---|---|---|---|---|
| | | Band 1 | Band 2 | Band 3 | Band 4 | Band 5 | CA_1C | CA_1A-5A | CA_5C |
| INTER-FREQ BAND LIST | Band 1 | - | 0/1 | 0/1 | 0/1 | 0/1 | - | - | 0/1 |
| | Band 2 | 0/1 | - | 0/1 | 0/1 | 0/1 | 0/1 | 0/1 | 0/1 |
| | Band 3 | 0/1 | 0/1 | - | 0/1 | 0/1 | 0/1 | 0/1 | 0/1 |
| | Band 4 | 0/1 | 0/1 | 0/1 | - | 0/1 | 0/1 | 0/1 | 0/1 |
| | Band 5 | 0/1 | 0/1 | 0/1 | 0/1 | - | 0/1 | - | - |
| INTER-RAT BAND LIST | Band X | 0/1 | 0/1 | 0/1 | 0/1 | 0/1 | 0/1 | 0/1 | 0/1 |
| | Band Y | 0/1 | 0/1 | 0/1 | 0/1 | 0/1 | 0/1 | 0/1 | 0/1 |
| | Band Z | 0/1 | 0/1 | 0/1 | 0/1 | 0/1 | 0/1 | 0/1 | 0/1 |

FIG. 6

| MEASUREMENT PARAMETERS (NEED FOR GAPS) | | BAND LIST EUTRA | | | | | CA BAND COMBINATION LIST EUTRA | | |
|---|---|---|---|---|---|---|---|---|---|
| | | Band 1 | Band 2 | Band 3 | Band 4 | Band 5 | CA_1C | CA_1A-5A | CA_5C |
| INTER-FREQ BAND LIST | Band 1 | - | 1 | 1 | 1 | 0 | - | - | 0 |
| | Band 2 | 1 | - | 1 | 1 | 0 | 1 | 1 | 0 |
| | Band 3 | 1 | 1 | - | 1 | 0 | 1 | 1 | 0 |
| | Band 4 | 1 | 1 | 1 | - | 0 | 1 | 1 | 0 |
| | Band 5 | 0 | 0 | 0 | 0 | - | 0 | - | - |
| INTER-RAT BAND LIST (UTRA) | B1 | 1 | 1 | 1 | 1 | 0 | 1 | 1 | 0 |
| | B2 | 1 | 1 | 1 | 1 | 0 | 1 | 1 | 0 |
| | B3 | 1 | 1 | 1 | 1 | 0 | 1 | 1 | 0 |

701

| MEASUREMENT PARAMETERS (NEED FOR GAPS) (inter-freq CA, intra-freq CA, NON-CA) | | BAND LIST EUTRA | | | | |
|---|---|---|---|---|---|---|
| | | Band 1 | Band 2 | Band 3 | Band 4 | Band 5 |
| INTER-FREQ BAND LIST | Band 1 | - | (0/1, 0/1, 0/1) | (0/1, 0/1, 0/1) | (0/1, 0/1, 0/1) | (0/1, 0/1, 0/1) |
| | Band 2 | (0/1, 0/1, 0/1) | - | (0/1, 0/1, 0/1) | (0/1, 0/1, 0/1) | (0/1, 0/1, 0/1) |
| | Band 3 | (0/1, 0/1, 0/1) | (0/1, 0/1, 0/1) | - | (0/1, 0/1, 0/1) | (0/1, 0/1, 0/1) |
| | Band 4 | (0/1, 0/1, 0/1) | (0/1, 0/1, 0/1) | (0/1, 0/1, 0/1) | - | (0/1, 0/1, 0/1) |
| | Band 5 | (0/1, 0/1, 0/1) | (0/1, 0/1, 0/1) | (0/1, 0/1, 0/1) | (0/1, 0/1, 0/1) | - |
| INTER-RAT BAND LIST | Band X | (0/1, 0/1, 0/1) | (0/1, 0/1, 0/1) | (0/1, 0/1, 0/1) | (0/1, 0/1, 0/1) | (0/1, 0/1, 0/1) |
| | Band Y | (0/1, 0/1, 0/1) | (0/1, 0/1, 0/1) | (0/1, 0/1, 0/1) | (0/1, 0/1, 0/1) | (0/1, 0/1, 0/1) |
| | Band Z | (0/1, 0/1, 0/1) | (0/1, 0/1, 0/1) | (0/1, 0/1, 0/1) | (0/1, 0/1, 0/1) | (0/1, 0/1, 0/1) |

| MEASUREMENT PARAMETERS (NEED FOR GAPS) (inter-freq CA, intra-freq CA, NON-CA) | | BAND LIST EUTRA | | | | |
|---|---|---|---|---|---|---|
| | | Band 1 | Band 2 | Band 3 | Band 4 | Band 5 |
| INTER-FREQ BAND LIST | Band 1 | - | (-, -, 1) | (-, -, 1) | (-, -, 1) | (1, -, 0) |
| | Band 2 | (1, 1, 1) | - | (-, -, 1) | (-, -, 1) | (1, -, 0) |
| | Band 3 | (1, 1, 1) | (-, -, 1) | - | (-, -, 1) | (1, -, 0) |
| | Band 4 | (1, 1, 1) | (-, -, 1) | (-, -, 1) | - | (1, -, 0) |
| | Band 5 | (1, 1, 0) | (-, -, 0) | (-, -, 0) | (-, -, 0) | - |
| INTER-RAT BAND LIST (UTRA) | B1 | (1, 1, 1) | (-, -, 1) | (-, -, 1) | (-, -, 1) | (1, -, 0) |
| | B2 | (1, 1, 1) | (-, -, 1) | (-, -, 1) | (-, -, 1) | (1, -, 0) |
| | B3 | (1, 1, 1) | (-, -, 1) | (-, -, 1) | (-, -, 1) | (1, -, 0) |

FIG. 8

| | CONFIGURED CC | NEED FOR MEASUREMENT GAP | NUMBER OF INTER-FREQ BAND TO BE MEASURED |
|---|---|---|---|
| Scenario 1 | Band 1 | 0 | 0 |
| Scenario 2 | Band 1 | 1 | 5 |
| | Band 5 | 1 | 4 |
| Scenario 3 | Band 2 | 0 | 0 |
| | Band 3 | 1 | 9 |

FIG. 9

TRIGGERING OF MEASUREMENT
PARAMETER REPORTING

FIG. 10

MEASUREMENT GAP CONFIGURATION AND APPLICATION

FIG. 11

SCHEDULING MEASUREMENT GAP

MEASUREMENT GAP CONFIGURATION IN WIRELESS COMMUNICATION SYSTEMS WITH CARRIER AGGREGATION

CROSS REFERENCE TO RELATED APPLICATION

This application claims priority under 35 U.S.C. §119 from U.S. Provisional Application No. 61/431,301, entitled "Measurement Gap Configuration in Carrier Aggregations," filed on Jan. 10, 2011, the subject matter of which is incorporated herein by reference.

TECHNICAL FIELD

The disclosed embodiments relate generally to multi-carrier wireless communication systems, and, more particularly, to measurement gap configuration in carrier aggregations.

BACKGROUND

E-UTRAN is the air interface of 3GPP's Long Term Evolution (LTE) upgrade path for mobile networks. In E-UTRAN mobile networks, the network controls a UE to perform measurement for intra/inter-frequency mobility by using broadcast or dedicated control. For example, in RCC_IDLE state, a UE shall follow the measurement parameters defined for cell reselection specified by the E-UTRAN broadcast. On the other hand, in RCC_CONNECTED state, a UE shall follow the measurement configurations specified by radio resource control (RRC) directed from the E-UTRAN (e.g., as in UTRAN MEASUREMENT_CONTROL).

Figure 1A:
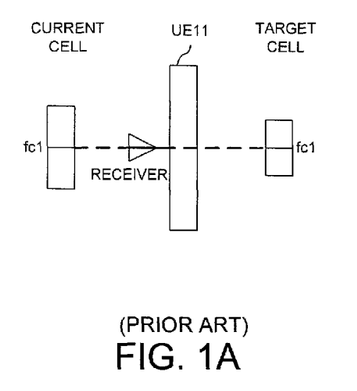
FIG. 1A (Prior Art) illustrates an intra-freq measurement scenario.

In single-carrier mobile networks, intra-freq measurement occurs when the current and the target cell operate on the same carrier frequency. FIG. 1A (Prior Art) illustrates an intra-freq measurement scenario. In the example of FIG. 1A, UE11 is served in a current cell on carrier frequency fc1, while the to-be-measured target cell also operates on carrier frequency fc1. In such a scenario, UE11 should be able to carry out such measurements without measurement gaps. This is because the receiver on UE11 is able to measure reference signals on fc1 while simultaneously performing data communication on the same fc1.

Figure 1B:
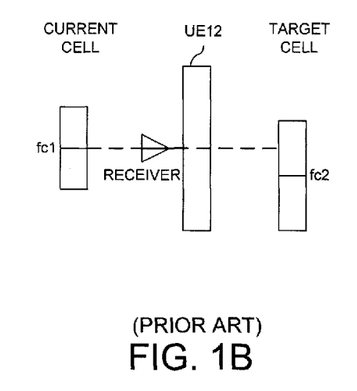
FIG. 1B (Prior Art) illustrates an inter-freq measurement scenario.

On the other hand, inter-freq measurement occurs when the target cell operates on a different carrier frequency as compared to the current cell. Similarly, inter-RAT (Radio Access Technology) measurement occurs when the target cell operates on a different RAT as compared to the current cell. FIG. 1B (Prior Art) illustrates an inter-freq measurement scenario. In the example of FIG. 1B, UE12 is served in a current cell on carrier frequency fc1, while the to-be-measured target cell operates on a different carrier frequency fc2. In such a scenario, UE12 should not be able to carry out measurements without measurement gaps. This is because the receiver on UE12 needs to switch to fc2 to perform measurements and then switch back to fc1 to perform data communication.

Figure 2A:
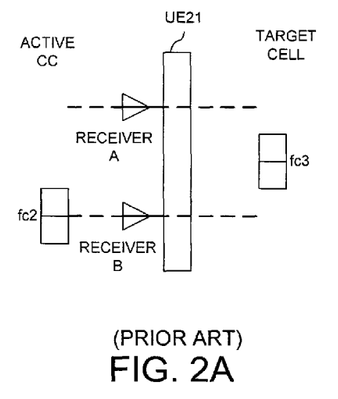
FIG. 2A (Prior Art) illustrates a scenario where no measurement gap is needed.
Figure 2B:
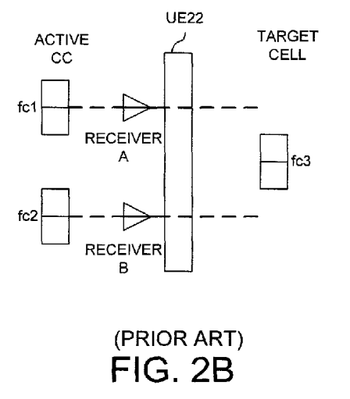
FIG. 2B (Prior Art) illustrates a scenario where measurement gap is needed.

In multi-carrier mobile networks with carrier aggregation, it is with high probability that a UE is equipped with multiple receivers. Whether the UE needs measurement gap for inter-frequency or inter-RAT measurement depends on the use of its receivers. FIG. 2A (Prior Art) illustrates a scenario where no measurement gap is needed. In the example of FIG. 2A, receiver A is not configured with any component carrier (CC), while receiver B is used to perform data communication over an active CC on fc2. Because receiver A is idle, it can be tuned to fc3 of the target cell, thus UE21 does not need measurement gap to perform measurements for the target cell. FIG. 2B (Prior Art) illustrates a scenario where measurement gap is needed. In the example of FIG. 2B, UE22 uses receiver A to perform data communication over an active CC on fc1, and uses receiver B to perform data communication over another active CC on fc2. Because both receivers are occupied, UE22 needs measurement gap to perform inter-frequency measurements for the target cell, which operates on a different carrier frequency fc3.

In LTE/LTE-A systems, a UE may report the need for measurement gap (MG) to its serving eNB as part of UE capability. Based on the UE capability report, the eNB configures for MG on per-UE basis. In general, in a first scenario, if at least one receiver is not configured with a component carrier, then the UE may not need MG for inter-freq/inter-RAT measurements. In a second scenario, if all receivers are occupied for data transmission, then the UE may need MG for inter-freq/inter-RAT measurements. Under current MG reporting and configuration, however, the eNB has no information to distinguish between the first and the second scenarios. Besides, with current MG signaling, MG configuration is per-UE basis. Once MG is configured to a UE with multiple receivers, the network does not expect data transmission on all receivers of the UE. In other words, all receivers in the UE should apply the same MG configuration, causing significant UE throughput decrease. On the other hand, if a UE is not configured with MG (but the UE actually needs MG to perform measurements), then the UE should perform inter-freq/inter-RAT measurements only in DRX mode, causing non-up-to-date measurement results and possibly handover delay.

In order to maintain effective and efficient system operation, it is desirable for a UE to accurately report its need of measurement gap to an eNB. It is also desirable for the eNB to properly configure the UE with measurement gap according to its need.

SUMMARY

A method of measurement gap reporting and configuration is provided. In a mobile network, a UE receives a capability enquiry message from a serving base station. The UE comprises one or more radio frequency modules that support a list of frequency bands and a list of carrier aggregation (CA) band combinations. In response to the enquiry, the UE transmits capability information containing measurement parameters to the base station. In one embodiment, the measurement parameters comprise need-for-gap parameters for each frequency band and each CA band combinations associated with a list of to-be-measured frequency bands of target cells. In another embodiment, the measurement parameters comprises pairs of need-for-gap parameters, each pair indicates whether the UE needs measurement gap in CA mode and non-CA mode. In yet another embodiment, the measurement parameters comprises need-for-gap parameters per configured component carrier (CC) and the number of to-be-measured frequency bands of each corresponding configured CC.

Based on the reported measurement parameters, the eNB transmits a measurement configuration message to the UE. In one example, the configuration message contains a gap offset that determines a measurement gap reception period (MGRP) and a frame/subframe location for performing measurements. In another example, the configuration message configures a measurement gap for the UE with CC identities. The UE then transmits a measurement gap application message back to the base station. The measurement gap application message indicates whether the UE applies MG for each configured CC. In one example, the UE reports its MG application of each configured CC when the measurement configuration changes or when CC changes (e.g., when CC is added, modified, or released). The eNB may optionally transmit a confirmation message in response to the measurement gap application message. The confirmation message either confirms or rejects the MG application reported by the UE. Finally, the UE applies MG based on the confirmation message.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
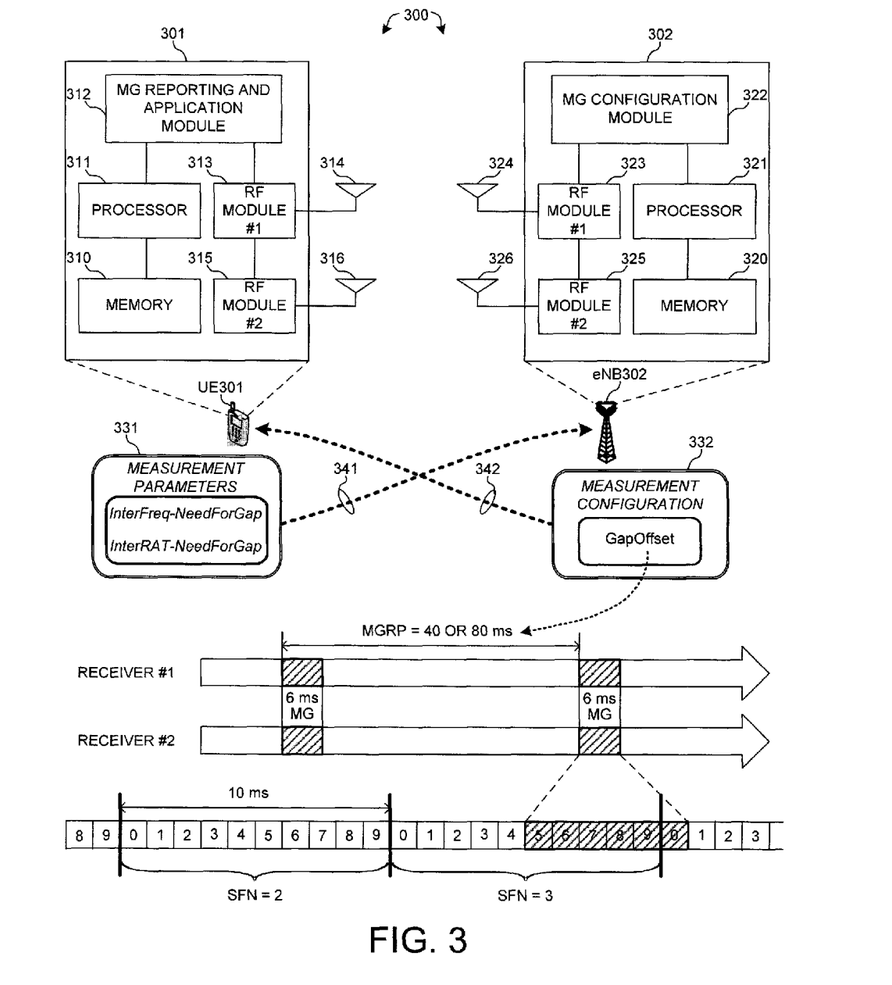
FIG. 3 illustrates a mobile network with measurement gap reporting and configuration in accordance with one novel aspect.

FIG. 3 illustrates a mobile network 300 with measurement gap reporting and configuration in accordance with one novel aspect. Mobile network 300 comprises a user equipment UE301 and a serving base station eNB302. UE301 comprises memory 310, a processor 311, a measurement gap reporting and application module 312, a first radio frequency module 313 (RF#1) coupled to antenna 314, and a second radio frequency module 315 (RF#2) couple to antenna 316. Similarly, eNB302 comprises memory 320, a processor 321, a measurement gap configuration module 322, a first RF module 323 (RF#1) coupled to antenna 324, and a second RF module 325 (RF#2) couple to antenna 326.

In E-UTRAN mobile networks, the network controls a UE to perform measurement for intra/inter-frequency mobility by using broadcast or dedicated control. In multi-carrier mobile networks with carrier aggregation (CA), it is with high probability that a UE is equipped with multiple receivers. Whether the UE needs measurement gap (MG) for inter-frequency or inter-RAT measurement depends on the use of its receivers. In one novel aspect, a UE may report the need for MG for all supported frequency bands including CA band combinations to its serving eNB. Based on the UE report, the eNB then configures MG for the UE accordingly.

In the example of FIG. 3, UE301 reports measurement parameters (e.g., determined by MG reporting and application module 312 as part of UE capability as depicted by line 341) to eNB302. The reported measurement parameters includes InterFreq-NeedForGap and InterRAT-NeedForGap information for all supported frequency bands including CA band combinations as depicted in box 331. Based on the reported measurement parameters, eNB302 configures measurement gap (e.g., configured by MG configuration module 322 via a measurement configuration message as depicted by line 342) for UE301. The measurement configuration message includes a GapOffset as depicted in box 332.

The GapOffset is a MG configuration parameter that determines the measurement gap reception period (MGRP) when MG is configured for a UE. MGRP represents the time of one measurement cycle, reflecting how often the UE performs measurements. For example, a GapOffset gp0 (0..39) corresponds to gap offset of Gap Pattern Id "0" with MGRP=40 ms (e.g., UE performs measurements every 40 ms), and a GapOffset gp1(0..79) means gap Offset of Gap Pattern Id "1" with MGRP=80 ms (e.g., UE performs measurements every 80 ms). The measurement gap itself is equal to 6 ms as defined by the LTE/LTE-A specification. As illustrated in FIG. 3, if UE301 is configured with MG, then both receivers #1 and #2 of UE301 perform measurements on target cells during the 6 ms MG every 40 ms or 80 ms MGRP. The GapOffset parameter also determines the system frame number (SFN) and the subframe number that the UE starts to perform measurements based on the following equations:

$$\text{SFN mod } T = \text{FLOOR}(\text{gapOffset}/10)$$

$$\text{subframe} = \text{gapOffset mod } 10$$

with $T = MGRP/10$

In one specific example, if GapOffset gp0=35, then MGRP=40ms, T=MGRP/10=4, (SFN mod 4)=FLOOR (35/10)=3, and subframe=35 mod 10=5. That means, the UE will switch its receivers off from the serving cell to perform inter-freq/inter-RAT measurements at subframe 5 on SFN=3, 7, 11, 15 . . . for 6 ms long, and then switch back to the serving cell after inter-freq/inter-RAT measurements, as depicted by FIG. 3.

Figure 4:
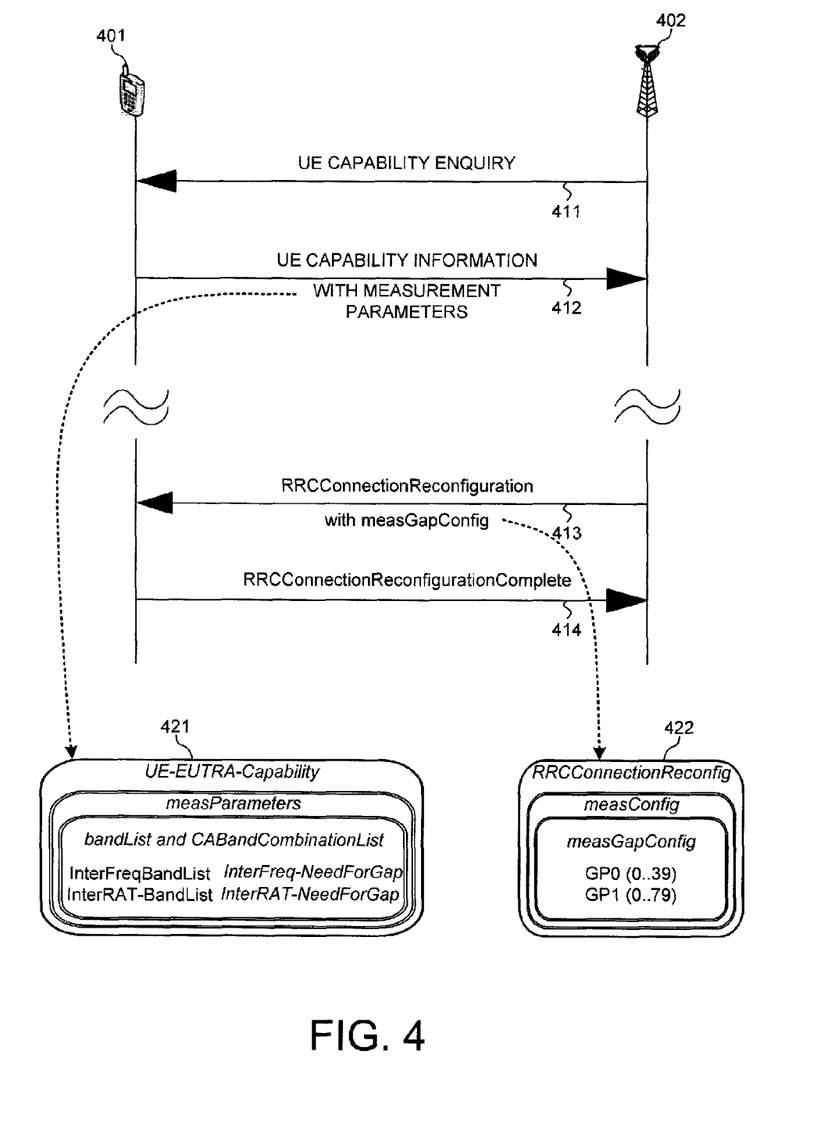
FIG. 4 illustrates a procedure of reporting and configuring measurement gap between a UE and an eNB in accordance with one novel aspect.

FIG. 4 illustrates a procedure of reporting and configuring measurement gap between UE401 and eNB402 in accordance with one novel aspect. In step 411, eNB402 first transmits a UE capability enquiry message to UE401. In response to the capability enquiry message, UE401 reports UE capability information back to eNB402 in step 412. The UE capability information includes measurement parameters. For example, as depicted by box 421, UE-EUTRA-Capability includes measParameters, which further includes need-for-gap parameters for each supported frequency band (e.g., a bandList) and each supported CA band combination (e.g., a CABandCombinationList). The need-for-gap parameters are associated to a list of inter-frequency bands (e.g., InterFreq- BandList) and a list of inter-RAT bands (e.g., InterRAT-BandList) of the to-be-measured target cells. In step 413, eNB402 transmits a measurement configuration message (e.g., RRCConnectionReconfiguration message) to UE401. The measurement configuration message includes measurement configuration parameters. For example, as depicted by box 422, RRCConnectionReconfig includes measConfig, which further includes gp0 or gp1 for measurement configuration parameters (e.g., measGapConfig). The measurement configuration parameters gp0 and gp1 are used to configure the MG for UE401. In step 414, UE401 transmits an RRCConnectionReconfigurationComplete message to eNB402 after receiving and applying the measurement configuration parameters.

A first issue of measurement gap configuration is for a UE to accurately report its need of measurement gap to an eNB. Because the UE is very likely equipped with multiple receivers, the need of measurement gap depends on the use of its receivers. In general, if at least one receiver is not configured with a component carrier, the UE may not need MG for inter-freq/inter-RAT measurements. On the other hand, if all receivers are occupied for data transmission, the UE may need MG for inter-freq/inter-RAT measurements. Carrier aggregation, however, makes the problem even more complicated. For intra-band carrier aggregation (two component carriers in the same frequency band), a UE may use only one receiver to support an intra-band CA band combination. On the other hand, for inter-band carrier aggregation (two component carriers in different frequency bands), a UE may need to use two receivers to support an inter-band CA band combination. Furthermore, the need for MG may be changed due to the (re)configuration of CA. Therefore, various methods are proposed below for a UE to accurately report measurement parameters to an eNB.

Figure 5:
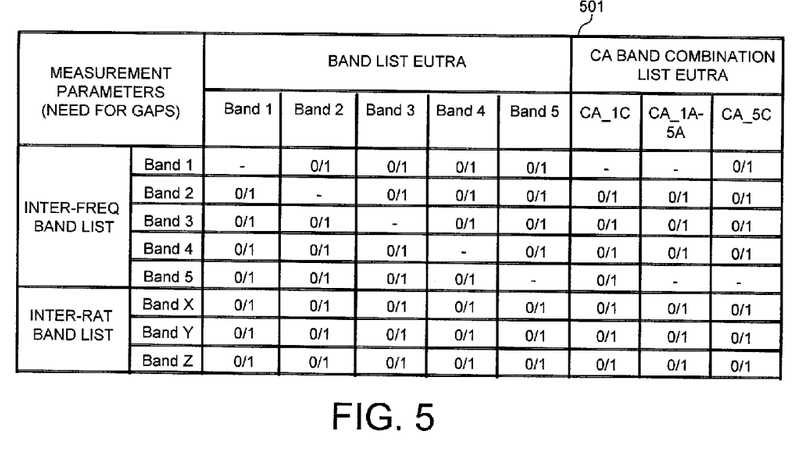
FIG. 5 illustrates a first embodiment of reporting measurement parameters in accordance with one novel aspect.

FIG. 5 illustrates a first embodiment of reporting measurement parameters in accordance with one novel aspect. Table 501 of FIG. 5 contains measurement parameters (e.g., need-for-gap) for a list of supported frequency bands and a list of supported carrier aggregation (CA) band combinations to be reported by a UE to its eNB. For example, if the UE supports five EUTRA frequency bands (Band 1 to Band 5 in BAND LIST) and three CA band combinations (CA_1C (two component carriers in Band 1) and CA_1A-5A (one component carrier in Band 1 and one component carrier in Band 5) and CA_5C (two component carriers in Band 5) in CA BAND COMBINATION LIST), then table 501 contains eight columns, each column corresponds to one of the five frequency bands or one of the three CA band combinations. On the other hand, if the to-be-measured frequency bands for the UE include five inter-frequency LTE bands (Band 1 to Band 5 in INTER-FREQ BAND LIST) and three inter-RAT bands (Band X, Y, and Z in INTER-RAT BAND LIST), then table 501 contains eight rows, each row corresponds to one of the five inter-freq LTE bands or one of the three inter-RAT bands. In one embodiment, each need-for-gap parameter is a Boolean variable having a value of digital zero (0) or one (1). A digital zero indicates that no measurement gap is needed, while a digital one indicates that measurement gap is needed for a specific band associated with a specific to-be-measured band.

Figure 6:
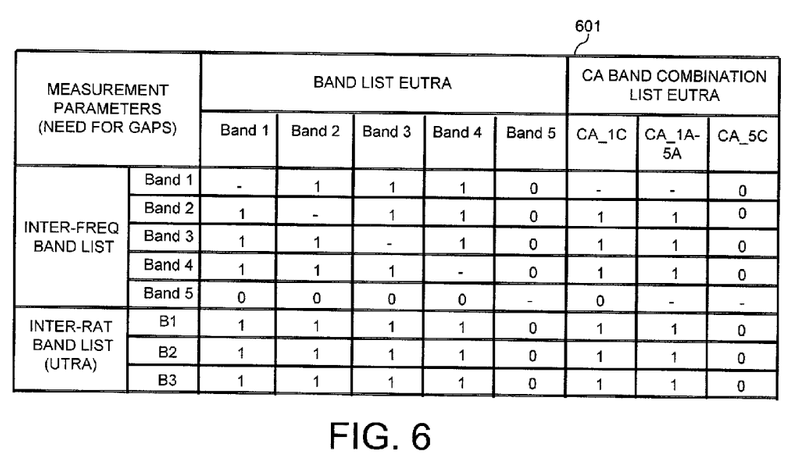
FIG. 6 illustrates one example of the first embodiment of reporting measurement parameters.

FIG. 6 illustrates one specific example of the first embodiment of reporting measurement parameters. In the example of FIG. 6, a UE supports operation in LTE frequency bands from Band 1 to Band 5, CA_1C (two component carriers in Band 1), CA_1A-5A (one component carrier in Band 1 and one component carrier in Band 5), and CA_5C (two component carriers in Band 5). The UE also supports inter-RAT UTRA frequency bands B1, B2 and B3. In this specific example, the UE is equipped with two receivers. One receiver operates in Band 1, Band 2, Band 3, and Band 4, while the other receiver operates in Band 5. As a result, the inter-freq/inter-RAT measurement parameters that the UE needs to report to the eNB is depicted by table 601 of FIG. 6. It can be seen from this example, when the UE operates in Band 5, the eNB may not need to configure MG for the UE because the UE can measure the inter-freq/inter-RAT by its free receiver supporting operation in Band 1, Band 2, Band 3 and Band 4. When the CA is configured to the UE, whether the UE needs the gap for inter-freq/inter-RAT measurements depends on the UE's reporting on CA band combinations. For example, if CA_1A-5A is configured to the UE, i.e., the UE operates in Band 1 and Band 5 simultaneously, then the eNB may need to configure the MG to the UE because no free receiver is available to perform inter-freq/inter-RAT measurement. On the other hand, if CA_5C is configured to the UE, the eNB may not need to configure MG to the UE. With the report of measurement parameters for each frequency band and each CA band combinations associated with a list of to-be-measured frequency bands from a UE, an eNB can decide MG configuration and set the measurement period to the UE more accurately. Thus, the radio resource can be utilized more efficiently.

Figure 7:
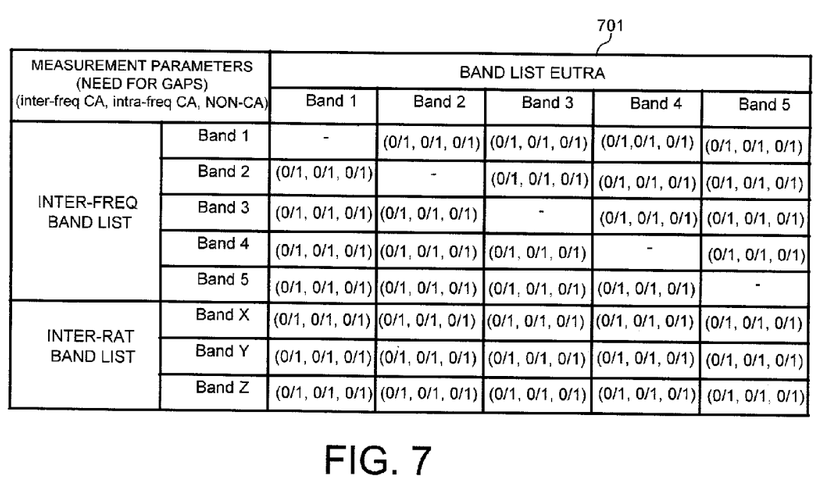
FIG. 7 illustrates a second embodiment of reporting measurement parameters in accordance with one novel aspect.

FIG. 7 illustrates a second embodiment of reporting measurement parameters in accordance with one novel aspect. Table 701 of FIG. 7 contains measurement parameters (e.g., need-for-gap) for a list of supported frequency bands to be reported by a UE to its eNB. For example, if the UE supports five EUTRA frequency bands (Band 1 to Band 5 in BAND LIST), then table 701 contains five columns, each column corresponds to one of the five frequency bands. On the other hand, if the to-be-measured frequency bands for the UE include five inter-frequency LTE bands (Band 1 to Band 5 in INTER-FREQ BAND LIST) and three inter-RAT bands (Band X, Y, and Z in INTER-RAT BAND LIST), then table 701 contains eight rows, each row corresponds to one of the five inter-freq LTE bands or one of the three inter-RAT frequency bands.

In the embodiment of FIG. 7, the measurement parameter format is redefined to contain more than a single need-for-gap parameter. Instead, each need-for-gap parameter may contain a pair of or a trio of Boolean variables, each Boolean variable having a value of digital zero (0) or one (1). A digital zero indicates that no measurement gap is needed, while a digital one indicates that measurement gap is needed. The first Boolean variable is used for UE configured with inter-freq CA mode, the second Boolean variable is used for UE configured with intra-freq CA mode, while the third Boolean variable is used for UE configured with non-CA mode. A trio without filling a value means not available for the corresponding mode. For example, a trio of Boolean values (1, -, 0) indicates that the UE needs measurement gap in inter-freq CA mode, does not support intra-freq CA mode, and does not need measurement gap in non-CA mode.

Figure 8:
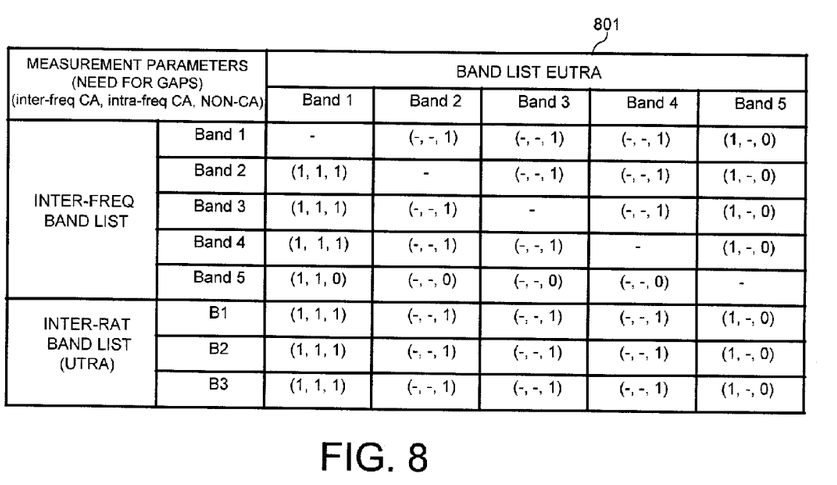
FIG. 8 illustrates one example of the second embodiment of reporting measurement parameters.

FIG. 8 illustrates one specific example of the second embodiment of reporting measurement parameters. In the example of FIG. 8, a UE supports operation in LTE frequency bands from Band 1 to Band 5, CA_1C (two component carriers in Band 1), and CA_1A-5A (one component carrier in Band 1 and one component carrier in Band 5). The UE also supports inter-RAT UTRA frequency bands B1, B2 and B3. In this specific example, the UE is equipped with two receivers. One receiver operates in Band 1, Band 2, Band 3, and Band 4, while the other receiver operates in Band 5. As a result, the inter-freq/inter-RAT measurement parameters that the UE needs to report to the eNB is depicted by table 801 of FIG. 8. With the need-for-gap reported from UE, the eNB may not configure MG for the UE when the UE operates non-CA mode in Band 5, while the eNB may configure MG for the UE when the UE operates in inter-freq CA mode such as CA_1A-5A, i.e., carrier aggregation with one component carrier in Band 1 and one component carrier in Band 5.

Figure 9:
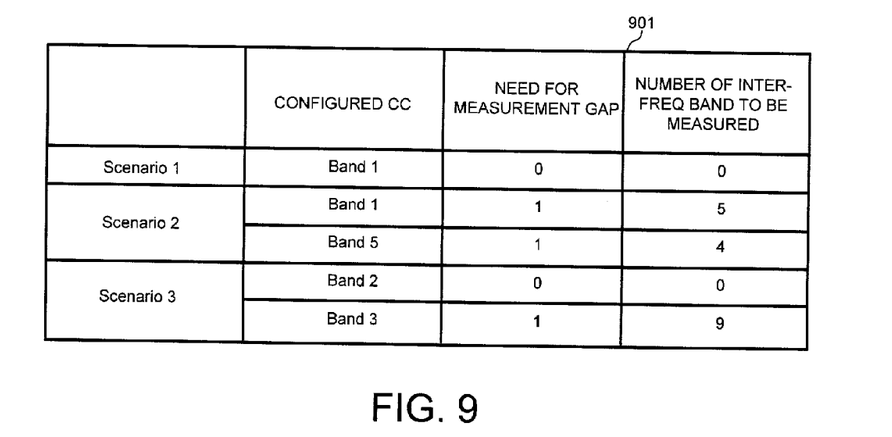
FIG. 9 illustrates a third embodiment of reporting measurement parameters in accordance with one novel aspect.

FIG. 9 illustrates a third embodiment of reporting measurement parameters in accordance with one novel aspect. In the example of FIG. 9, a UE may report the need of measurement gap per configured component carrier (CC) and the number of to-be-measured inter-frequency bands of each corresponding configured CC. As illustrated by table 901 of FIG. 9, the UE has three implementation scenarios. In scenario 1, the UE has one configured CC in Band 1, and the UE does not need measurement gap (e.g., the UE has two receivers, and one is idle). In scenario 2, the UE have two configured CCs, a first CC1 in Band 1 and a second CC2 in Band 5. For CC1, the UE needs measurement gap, and the number of to-be-measured inter-freq bands is equal to five. For CC2, the UE also needs measurement gap, and the number of to-be-measured inter-freq bands is equal to four. In scenario 3, the UE have two configured CCs, a first CC1 in Band 2 and a second CC2 in Band 3. For CC1, the UE does not need measurement gap. For CC2, the UE needs measurement gap, and the number of to-be-measured inter-freq bands is equal to nine.

If a UE needs MG while the eNB does not configure to the UE properly, then the UE can only perform inter-freq/RAT measurements in discontinuous reception (DRX). However, the measurement requirement imposed by the network may not be satisfied due to the less frequent DRX or not long enough DRX, causing non-up-to-date measurements results and possibly handover delay. On the other hand, once MG is configured to a UE that does not need MG, the network does not expect data transmission on all receivers of the UE. In other words, all receivers in the UE should apply the same MG configuration, causing significant UE throughput decrease. With the measurement parameters report from the UE, the eNB may determine to release or to setup measurement gap and determine the MGRP to the UE more specifically. Take Table 601 of FIG. 6 as an example. The eNB may release the MG configuration to a UE when the CA configuration to the UE is CA_5C. The eNB may setup the MG configuration to the UE when the CA is reconfigured to CA_1A-5A.

Figure 10:
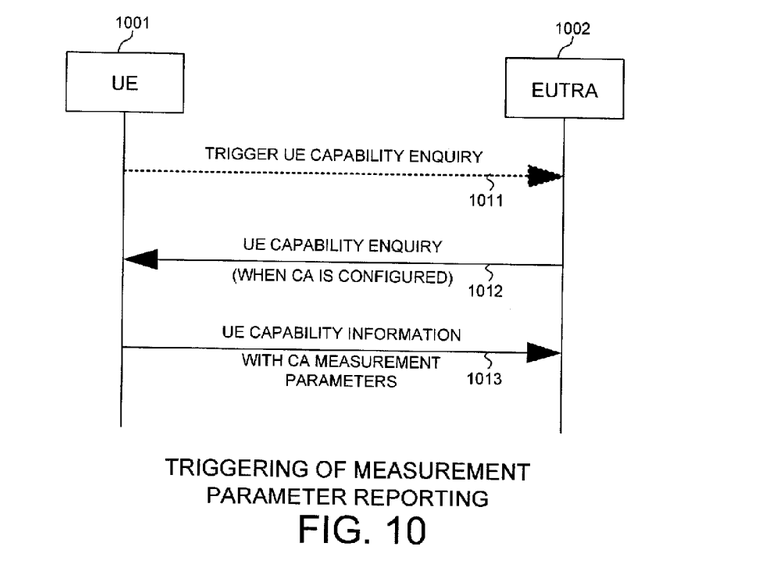
FIG. 10 illustrates several triggering conditions of reporting measurement parameters in a mobile network.

FIG. 10 illustrates several triggering conditions of reporting measurement parameters in a mobile network comprising a UE1001 and an eNB1002. UE1001 may report its measurement parameters to eNB1002 under three triggering conditions. Under a first condition, the UE may report measParameters with both CA and non-CA modes after eNB enquiries. Under a second condition, the UE may report measParameters for CA mode when CA is configured. Under a third condition, when the need for MG is changed, the UE may first trigger the eNB to re-enquiry UE the need of MG. For example, the need for MG may be changed due to the (re) configuration of CA. Upon eNB enquiry, the UE then reports measParameters for both CA and non-CA mode. As illustrated in FIG. 10, in step 1011, UE1001 first transmits a triggering message to eNB1002. For example, the triggering message triggers UE capability enquiry when the need for MG is changed due to CA (re)configuration. In step 1012, eNB1002 transmits a UE capability enquiry message to UE1001. The UE capability enquiry may be triggered by UE1001, or automatically initiated by eNB1002 when CA is (re)configured. In response to the UE capability enquiry, UE1001 reports UE capability information back to eNB1002 in step 1013. The UE capability information includes measurement parameters such as the need-for-gap parameters for each supported band and each CA band combination.

Figure 11:
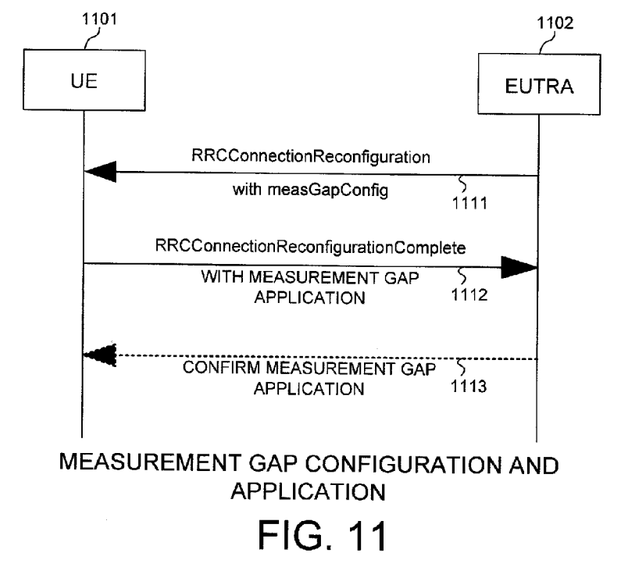
FIG. 11 illustrates several embodiments of measurement gap configuration and application in a mobile network.

A second issue in measurement gap configuration is for an eNB to properly configure the UE measurement gap according its need. FIG. 11 illustrates several embodiments of measurement gap configuration and application in a mobile network comprising a UE1101 and an eNB1102. As illustrated in FIG. 11, in step 1111, eNB1102 transmits a measurement configuration message (e.g., an RRCConnectionReconfiguration message) to UE1101. The measurement configuration message includes measurement gap parameters (e.g., measGapConfig) for UE1101. In step 1112, UE1101 transmits a measurement gap application message (e.g., RRCConnectionReconfigurationComplete message) to eNB1102 after receiving and applying the measurement gap parameters. The measurement gap application message includes the MG application of each configured component carrier (CC). In step 1113, eNB1102 optionally transmits a confirmation message to UE1101 such that UE1101 applies MG parameters according to the confirmation message.

In a first embodiment, UE1101 may report its MG application of each configured CC to eNB1102 (e.g., in step 1112) after receiving the measurement configuration message from eNB1102 (e.g., in step 1111). For example, UE1101 may decide which CCs to apply the MG parameters according to its RF chain usage. The MG application may be reported via a bitmap associated with each configured CC (e.g., 1 for applying MG on the corresponding CC, and 0 for not applying MG on the corresponding CC). In one specific example, UE1101 may report its MG application of each configured CC to eNB1102 when the measurement configuration changes or when CC configuration changes (e.g., when CC is added, modified, or released).

In a second embodiment, eNB1102 may confirm the MG usage by sending a confirmed message (e.g., step 1113). The confirmation message may be, for example, a binary bit (e.g., 1 for confirmation to UE's request of MG usage associated with each configured CC, and 0 for rejection and UE should apply the original MG configuration). The confirmation message may also be, for example, a MG bitmap associated with each configured CC (e.g., 1 for confirming MG on the corresponding configured CC, and 0 for rejecting). Based on the confirmation message, UE1101 applies measurement gap accordingly.

In a third embodiment, eNB1102 may configure measurement gap for UE1101 with CC identities. Typically, MG is configured per-UE basis. However, to optimize system operation, MG may also be configured per-CC basis. The measurement configuration message (e.g., measGapConfig) may include a gap-offset parameter as well as corresponding CC identities. For example, the primary component carrier (PCC) which is responsible for control information transmission is not configured with MG. On the other hand, secondary component carriers (SCCs) may be configured with MG for measurements.

The data transmission scheduling of a UE depends on whether the UE is configured with MG and whether the UE applies the configured MG. In general, if a configured CC is configured and applied with MG, then the eNB does not schedule the CC any uplink/downlink data transmission during the gap period (e.g., MG=6 ms) in every measurement cycle (e.g., MGRP=40/80 ms). On the other hand, if a configured CC is not configured or applied with MG, then the eNB can continue to schedule normal data transmission without interruption on the CC.

Figure 12:
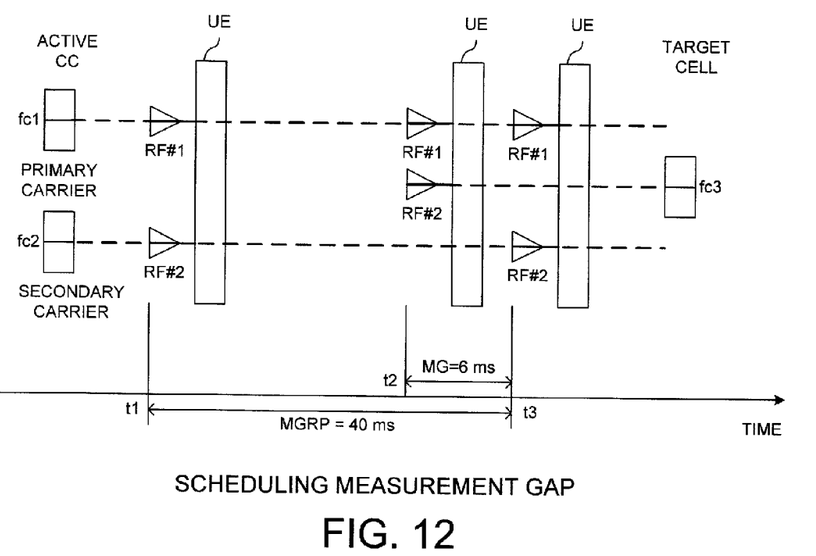
FIG. 12 illustrates the scheduling of a UE after measurement gap configuration and application.

FIG. 12 illustrates one example of UE scheduling after measurement gap configuration and application. In the example of FIG. 12, the UE has two radio frequency modules RF#1 and RF#2. RF#1 operates over a primary component carrier PCC with center frequency fc1, while RF#2 operates over a secondary component carrier SCC with center frequency fc2. In one embodiment, the UE sends measurement parameters (e.g., a need-for-gap bitmap) to eNB, and eNB responses with a configuration message to indicate which configured CCs are not configured with MG. These CCs can keep/resume normal operation (e.g., MG-less). For example, PCC is not configured with MG, so RF#1 of the UE operates at frequency band fc1 and keeps decoding PDCCH on PCC. On the other hand, SCC is configured with MG having MGRP=40 ms. As a result, RF#2 of the UE operates at frequency band fc2 from time t1, and switches to frequency band fc3 of the target cell at time t2 to perform measurements for 6 ms, and switches back to frequency band fc2 at time t3 to resume normal operation on SCC. If the UE receives a measurement configuration without additional information, for example, measurement gap without CC ID, then the UE should assume that MG is applied to all configured CCs. If the UE does not receive any confirmation from eNB, then the UE should apply the MG according to the original measurement configuration.

Figure 13:
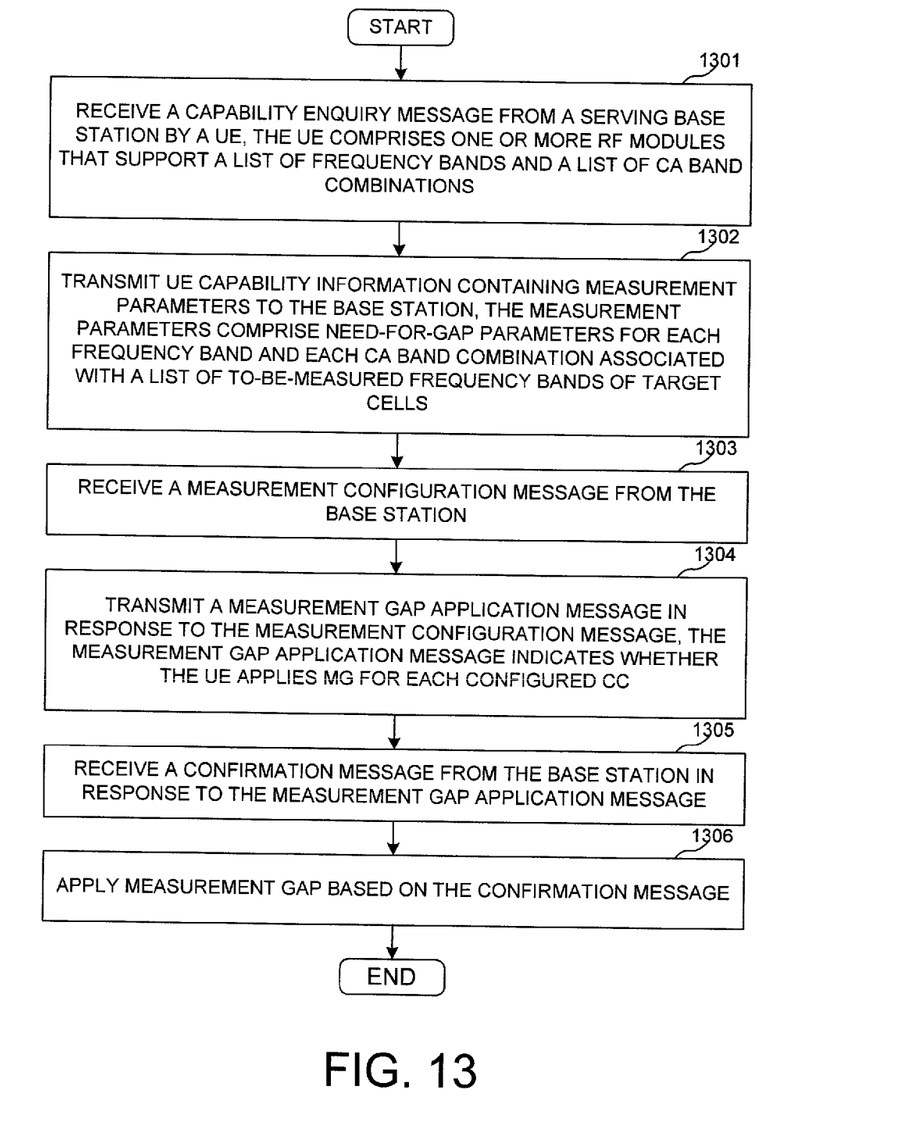
FIG. 13 is a flow chart of a method of measurement gap reporting, configuration, and application in accordance with one novel aspect.

FIG. 13 is a flow chart of a method of measurement gap reporting, configuration, and application in accordance with one novel aspect. In step 1301, a UE receives a capability enquiry message from a serving base station. The UE is equipped with multiple receivers supporting a list of frequency bands and a list of carrier aggregation (CA) band combinations. In step 1302, the UE transmits UE capability information to the base station. The capability information contains measurement parameters, which comprise need-for-gap parameters for each supported frequency band and CA band combination associated with a list of to-be-measured frequency bands of target cells. The to-be-measured frequency bands include an inter-frequency band list and an inter-RAT band list. Each need-for-gap parameter is a Boolean variable, indicating whether measurement gap is needed for a specific frequency band or CA band combination associated with a specific to-be-measured frequency band. In step 1303, the UE receives a measurement configuration message from the base station, which determines MG configuration for the UE based on the reported measurement parameters. In step 1304, the UE transmits a measurement gap application message to the base station. The measurement gap application message indicates whether the UE applies MG for each configured component carrier. In step 1305, the UE receives a confirmation message from the base station in response to the measurement gap application message. The confirmation message either confirms or rejects the MG application reported by the UE. Finally, in step 1306, the UE applies MG based on the confirmation message.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    receiving a capability enquiry message from a serving base station by a user equipment (UE), wherein the UE comprises one or more radio frequency modules that support a list of frequency bands and a list of carrier aggregation (CA) band combinations;
    transmitting UE capability information containing measurement parameters to the base station, wherein the measurement parameters comprise lists of need-for-gap parameters for each frequency band and each CA band combinations associated with a list of to-be-measured frequency bands of target cells, and
    wherein each list of need-for-parameters comprises a list of variable sets for each frequency band, each variable set comprises a first and a second variable indicating whether measurement gap is needed for a specific frequency band associated with a specific to-be-measured frequency band under non-CA mode and CA mode respectively;
    wherein the second variable indicates whether measurement gap is needed for the specific frequency band associated with the specific to-be-measured frequency band under intra-frequency CA mode, and wherein each variable set further comprises a third variable indicating whether measurement gap is needed for the specific frequency band associated with the specific to-be-measured frequency band under inter-frequency CA mode; and
    receiving a measurement configuration message from the base station.

2. The method of claim 1, wherein the list of to-be-measured frequency bands comprises an inter-frequency band list and an inter-RAT frequency band list.

3. The method of claim 1, wherein the UE reports measurement parameters to the base station when carrier aggregation is configured or re-configured.

4. The method of claim 1, further comprising:
    transmitting an explicit triggering message to the base station such that the base station transmits the UE capability enquiry message.

5. The method of claim 1, further comprising:
    transmitting a measurement gap application message in response to the measurement configuration message, wherein the measurement gap application message indicates whether the UE applies a measurement gap for each configured component carrier (CC).

6. The method of claim 5, wherein the UE transmits the measurement gap application message when CC configuration is changed in the UE.

7. A user equipment (UE), comprising:
    one or more radio frequency modules that support a list of frequency bands and a list of carrier aggregation (CA) band combinations; and
    a measurement module that determines measurement parameters, wherein the measurement parameters comprise lists of need-for-gap parameters for each frequency band and each CA band combinations associated with a list of to-be-measured frequency bands, and
    wherein each list of need-for-gap parameters comprises a list of variable sets for each frequency band, each variable set comprises a first and a second variable indicating whether measurement gap is need for a specific frequency band associated with a specific to-be-measured frequency band under non-CA mode and CA mode respectively;
    wherein the second variable indicates whether measurement gap is needed for the specific frequency band associated with the specific to-be-measured frequency band under intra-frequency CA mode, and wherein each variable set further comprises a third variable indicating whether measurement gap is needed for the specific frequency band associated with the specific to-be-measured frequency band under inter-frequency CA mode; and a transmitter that transmits UE capability information containing the measurement parameters to a base station in response to a UE capability enquiry message.

8. The user equipment of claim 7, wherein the list of to-be-measured frequency bands comprises an inter-frequency band list and an inter-RAT frequency band list.

9. The user equipment of claim 7, wherein the UE reports measurement parameters to the base station when carrier aggregation is configured or re-configured.

10. The user equipment of claim 7, wherein the UE transmits an explicit triggering message to the base station such that the base station transmits the UE capability enquiry message.

11. The user equipment of claim 7, wherein the UE transmits a measurement gap application message in response to a measurement configuration message, wherein the measurement gap application message indicates whether the UE applies a measurement gap for each configured component carrier.

12. The user equipment of claim 11, wherein the UE transmits the measurement gap application message when CC configuration is changed in the UE.

13. A method, comprising:
transmitting a capability enquiry message to a user equipment (UE) by a base station, wherein the UE supports a list of frequency bands and a list of carrier aggregation (CA) band combinations;
receiving UE capability information containing measurement parameters from the UE, wherein the measurement parameters comprise need-for-gap parameters for each frequency band and each CA band combinations associated with a list of to-be-measured frequency bands;
transmitting a measurement configuration message to the UE in response to the measurement parameters,
wherein the UE comprises lists of need-for-gap parameters;
wherein each list of need-for-gap parameters comprises a list of variable sets for each frequency band, each variable set comprises a first and a second variable indicating whether measurement gap is need for a specific frequency band associated with a specific to-be-measured frequency band under non-CA mode and CA mode respectively; and
wherein the second variable indicates whether measurement gap is needed for the specific frequency band associated with the specific to-be-measured frequency band under intra-frequency CA mode, and wherein each variable set further comprises a third variable indicating whether measurement gap is needed for the specific frequency band associated with the specific to-be-measured frequency band under inter-frequency CA mode.

14. The method of claim 13, wherein the configuration message contains a gap offset that determines a measurement gap reception period (MGRP) and a frame/subframe location for performing measurements.

15. The method of claim 13, wherein the configuration message comprises the first and the second component carrier identities.

16. The method of claim 13, further comprising:
receiving a measurement gap application message from the UE, wherein the measurement gap application message indicates whether the UE applies a measurement gap for each configured component carrier.

17. The method of claim 16, wherein the measurement gap application message is a bitmap, wherein each bit of the bitmap is associated with each configured component carrier.

18. The method of claim 16, further comprising:
transmitting a confirmation message to the UE in response to the measurement gap application message.

19. The method of claim 16, wherein the base station schedules normal data communication without interruption for a configured component carrier that does not apply a measurement gap.

* * * * *